United States Patent
Pollklas

(10) Patent No.: US 9,220,197 B2
(45) Date of Patent: Dec. 29, 2015

(54) SELF-PROPELLED AGRICULTURAL HARVESTING MACHINE

(71) Applicant: CLAAS SELBSTFAHRENDE ERNTEMASCHINEN GMBH, Harsewinkel (DE)

(72) Inventor: Manfred Pollklas, Rheda-Wiedenbrueck (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 69 days.

(21) Appl. No.: 14/164,335

(22) Filed: Jan. 27, 2014

(65) Prior Publication Data

US 2014/0215983 A1    Aug. 7, 2014

(30) Foreign Application Priority Data

Feb. 1, 2013   (DE) .......................... 10 2013 101 016

(51) Int. Cl.

| A01D 41/00 | (2006.01) |
|---|---|
| A01D 45/00 | (2006.01) |
| A01D 41/127 | (2006.01) |
| A01D 43/08 | (2006.01) |

(52) U.S. Cl.
CPC ............ *A01D 45/00* (2013.01); *A01D 41/1274* (2013.01); *A01D 43/085* (2013.01)

(58) Field of Classification Search
CPC ..... A01B 73/00; A01D 41/14; A01D 41/127; A01D 41/141; A01D 41/1274; A01D 41/1271; A01D 75/00; A01D 43/085; A01D 45/00; B02D 1/22; B02D 11/001; B02D 11/04
USPC ..... 56/10.2 E, 10.2 F, 10.2 R, 10.4, 208, 228; 180/6.3, 9.48, 307; 701/50, 70

See application file for complete search history.

(56) References Cited

U.S. PATENT DOCUMENTS

| 3,698,164 | A | * | 10/1972 | Boone et al. .................... 56/10.4 |
| 3,728,851 | A | * | 4/1973 | Van Antwerp .................. 56/208 |
| 4,130,980 | A | * | 12/1978 | Fardal et al. ................. 56/10.2 F |
| 6,167,337 | A | * | 12/2000 | Haack et al. ...................... 701/50 |
| 6,587,771 | B2 | * | 7/2003 | Panoushek et al. ............. 701/50 |
| 6,856,878 | B2 | * | 2/2005 | Braunhardt et al. ............ 701/50 |
| 7,540,129 | B2 | * | 6/2009 | Kormann ................... 56/10.2 E |

* cited by examiner

*Primary Examiner* — Robert Pezzuto
(74) *Attorney, Agent, or Firm* — Michael J. Striker

(57) ABSTRACT

A self-propelled agricultural harvesting machine such as a forage harvester includes a front harvesting attachment for picking up crop from a field as well as one or more working mechanisms for processing and conveying the crop. At least one functional device assigned to the harvesting machine can be adjusted with respect to one or more parameters for the purpose of adapting to different conditions of use. The machine includes a control device that operates in a field initial-cutting mode in order to specify at least one parameter setting for at least one of the functional devices so that the parameter setting the harvesting machine can be brought into a configuration that is suitable for the initial cutting of the field.

16 Claims, 2 Drawing Sheets

SELF-PROPELLED AGRICULTURAL HARVESTING MACHINE

CROSS-REFERENCE TO A RELATED APPLICATION

The invention described and claimed hereinbelow is also described in German Priority Document DE 10 2013 101016.4, filed on Feb. 1, 2013. The German Priority Document, the subject matter of which is incorporated herein by reference, provides the basis for a claim of priority of invention under 35 U.S.C. 119(a)-(d).

BACKGROUND OF THE INVENTION

The invention relates to a self-propelled agricultural harvesting such as a forage harvester configured with a front harvesting attachment for picking up crop from a field and a working mechanism for processing and/or conveying the crop.

Self-propelled harvesting machines such as forage harvesters in particular are usually used during the harvesting period on a large number of fields for reasons of economic efficiency. The drivers must therefore drive several times with the machine from one worked field to the next in order to start a new harvesting operation there.

The driver must always remain particularly attentive during the so-called "initial cutting" of a field, i.e., the first harvesting travel across the grown plant crop of a field. The driver must observe whether obstructions of any type (stones, demarcation devices, inclines, uneven terrain and, possibly living creatures) are located on the still barely visible path that could result in damage to the front harvesting attachment. In addition, the driver also must observe and monitor the transfer procedure. In a forage harvester, this includes visually monitoring the discharge of crop via a transfer device (also referred to as: "upper discharge chute") to an accompanying hauling vehicle, including a dynamic, fine-tuned adjustment of the transfer device to ensure that the crop stream hits the hauling vehicle and prevent crop losses. Since the transfer procedure in the initial cutting operation usually takes place in the rearward direction, for reasons of space, the driver must therefore look toward the front (harvesting operation) and toward the back (transfer procedure).

Due to the special harvesting conditions that exist during the initial cutting of the field (i.e., transfer toward the rear, poor visibility of the path, first start-up of the harvesting machine on a new field), the driver usually must set various parameters of the harvesting machine differently than for the (subsequent) harvesting operation on the initially-cut field. In order to perform initial cutting, therefore, automated functions such as cruise control or automated transfer are deactivated and/or other settings are selected for the cutting height or the engine speed. Since harvesting is usually performed under time pressure and, the driver must coordinate or at least remain aware of his own machine as well as the operation of the accompanying hauling vehicles, adjusting the harvesting machine for the initial cutting of the field is laborious and prone is to error. If the driver forgets to implement an important setting, then crop losses, quality losses, or even damage due to accidents can easily occur. For these reasons, in the initial cutting of the field, the harvesting machine is usually driven with great care and only under partial load.

SUMMARY OF THE INVENTION

The present invention overcomes the shortcomings of known arts, such as those mentioned above.

To that end, the present invention provides for relieving the driver of the harvesting machine at the beginning of the harvesting operation on an unworked field and, for increasing the reliability and efficiency of the harvesting procedure from the beginning for inexperienced drivers.

In an embodiment, the invention provides a harvesting machine characterized by a control device that is operated in a field initial-cutting mode in order to specify at least one parameter setting for at least one of the functional devices that is used, in order to bring the harvesting machine into a configuration that is suitable for the initial cutting of the field.

Due to the specification of parameter settings according to the invention for the at least one functional device, the driver is provided with a simple and reliable possibility for quickly switching the harvesting machine from any previous configuration into a configuration that is suitable for the "initial cutting of a field" harvesting situation, i.e. the first travel across a field covered with a plant crop. Any functional devices present on the harvesting machine can be used with other parameter settings by activating the field initial-cutting mode, for example by the press of a button, whereby the driver is not required to implement these parameters individually or for every functionality of the machine. Due to the parameter specification provided according to the invention, the driver therefore does not need to manually adjust a (usually) large number of parameters in the "initial cutting of the field" harvesting situation and, is therefore markedly relieved of duties. The reliability and efficiency of the harvesting operation therefore increase as well.

Conversely, the harvesting machine advantageously can be restored to the previous state by deactivating the field initial-cutting mode. The control device thereby ensures that parameter settings for a previously implemented configuration of the harvesting machine or for any other retrievably stored configuration are specified and, in particular, a corresponding adjustment is initiated.

The at least one functional device can be any type of device that is associated with the operation of the harvesting machine and has an adjustable parameter. One example thereof is a front harvesting attachment, the cutting height and/or conveying speed of which can be adjusted, an intake conveyor assembly, a conditioning device, or a discharge accelerator, each of which can have an adjustable conveying speed, or a transfer device having an adjustable position (rotational or elevation angle) and/or discharge angle (discharge flap). Further functional devices are automated devices, for example, such as a cruise controller, a self-steering device, or an automated transfer device, each of which can be activated and deactivated and can usually be adjusted in respect of various further parameters. Numerous further functional devices in this sense can be provided on the harvesting machine, which are taken into account in the operation of the harvesting machine in the field initial-cutting mode.

The specification provided according to the invention advantageously comprises parameter settings for a plurality of functional devices. Since, as initially mentioned, a large number of settings must be implemented on different functional devices on harvesting machines in order to perform initial cutting, the driver is therefore greatly relieved of duties in reliance on the field initial-cutting mode. That is, use of the invention relieves the driver of the plurality of adjustment measures and, therefore, there is practically no risk of adjustment measures being forgotten.

In an embodiment, the specification of the parameter setting can initially take place in the form of a recommendation, in particular, by means of an optical display and/or an acoustic notification to an operator. This provides the driver with the advantage that he can still decide for himself whether he wants to follow this recommendation or not.

For that matter, the control device has a signal connection to the at least one functional device in order to implement the at least one parameter setting on this functional device upon activation of the field initial-cutting mode. In this case, the predefinition of the parameter setting is not limited to a straightforward recommendation to the driver, but rather the adjustment also is implemented independently by means of suitable actuation. For example, a recommendation is first sent to the driver and that, upon confirmation of the recommendation (e.g., within the framework of a query via a control terminal), the setting is implemented via the control device.

The control device conveniently has access to a data memory, in which information related to the parameter settings to be specified within the scope of the field initial-cutting mode are stored, in order to be retrievable upon activation of the field initial-cutting mode.

Various sets of such information can be retrievably stored in the data memory. The information sets can be assigned, for example, to various kinds of crop, different operators, and/or other operating conditions. Given that various information sets are stored, the driver can therefore access suitable information depending on the intended use. For example, the driver could rapidly and easily configure the machine to various machine settings depending on the kind of crop (corn or grass). Settings specific to persons would also be possible, thereby making it possible to quickly implement driver-specific settings.

Moreover, the information stored in the data memory contains a selection of parameters to be specified. This means that, first of all, the information must provide an indication of which parameters should even be influenced within the scope of the field initial-cutting mode. Advantageously, this selection can be edited by the driver, i.e., the driver can decide individually whether and which parameters should even be adjusted for the operation in the field initial-cutting mode. Such decision making also can take place within the scope of a control terminal by the driver activating or deactivating individual parameters.

The information stored for an individual parameter conveniently contains a setting value in each case. Depending on the particular parameter, this is, in the simplest case, switching states such as "on" or "off" (e.g. for a cruise controller or a self-control device). The stored parameter information also can include, for example, numerical values (height, length, duration, speed, etc.), which correspond to setting values of the functional devices.

Advantageously, individual parameters to be specified by the control device within the scope of the field initial-cutting mode can be selected individually, and the setting thereof can be edited. This selection ability provides the advantage that the driver can freely determine and flexibly adjust the extent of influence during operation in the field initial-cutting mode.

In an embodiment, the field initial-cutting mode can be activated manually via a control terminal or a separate switching device within reach of the driver (preferably within the driver's cab).

In order to further relieve the driver of duties, the control device can automatically activate the field initial-cutting mode as soon as state information ascertained by the harvesting machine indicates the initial cutting of a field. State information used for this purpose could be obtained, for example, via sensors installed on the machine (throughput sensor, camera, location information (e.g. satellite-supported location identification)).

Basically, the initial cutting of a field is the first travel across the grown plant crop. Accordingly, a configuration that is suitable for the initial cutting of the field is a configuration with which the harvesting machine first performs an initial cutting on an outer edge of a field on which a plant crop grows and/or travels through such a field for the first time.

The parameter settings that can be specified within the scope of the field initial-cutting mode can be many types of settings that do not necessarily depend on the equipment installed on the harvesting machine. This includes possible settings of: cutting height, adjusting a self-steering device (e.g. the distance at which the harvesting machine is steered through the field relative to the plant crop), the speed of the front harvesting attachment, the speed of the intake conveyor mechanism, the speed of the conditioning device, the speed of the discharge accelerator, the gap width of the discharge accelerator, the activation state and/or cruise controller ground speed, the transfer device position, in particular the rotational angle, elevation angle and/or flap angle thereof, the activation state of a self-cleaning device, the ground drive state (in particular the activation state of a differential lock), the tire pressure level, the state of the illumination devices, etc. Numerous further adjustable parameters are feasible.

In an embodiment, upon activation of the field initial-cutting mode, a procedure carried out in preparation of the harvesting travel also is initiated, for example, a cleaning procedure on a functional device of the harvesting machine. Such a procedure can be, for example, opening and closing a drum disk (underneath the chopper drum), retracting or extending cutting knives protruding into the crop stream, sharpening cutting knives, adjusting the shear bar of a chopping assembly, cleaning optical elements (e.g. camera, infrared sensors), calibration procedures, or the like. An automatic implementation advantageously relieves the driver of tasks, who would otherwise have to initiate these procedures himself before starting the travel. Advantageously, an implementation of the particular procedure can be coupled to a previous state query and can take place only if the need therefore is ascertained (e.g., the drum disk is cleaned only if contaminated, or the like).

In order to ensure that the harvesting machine can be re-used easily and fault-free after the initial cutting of the field for the typical harvesting operation (in a forage harvester, for example, performing transfer using a laterally swiveled transfer device), deactivation of the field initial-cutting mode is enabled. After deactivation of the field initial-cutting mode, the control device is operated to specify parameter settings for a previously implemented configuration of the harvesting machine or for any other retrievably stored configuration and, to initiate a suitable setting in particular. In this manner the driver ensures that the harvesting machine quickly returns to a starting state or any other desired configuration.

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
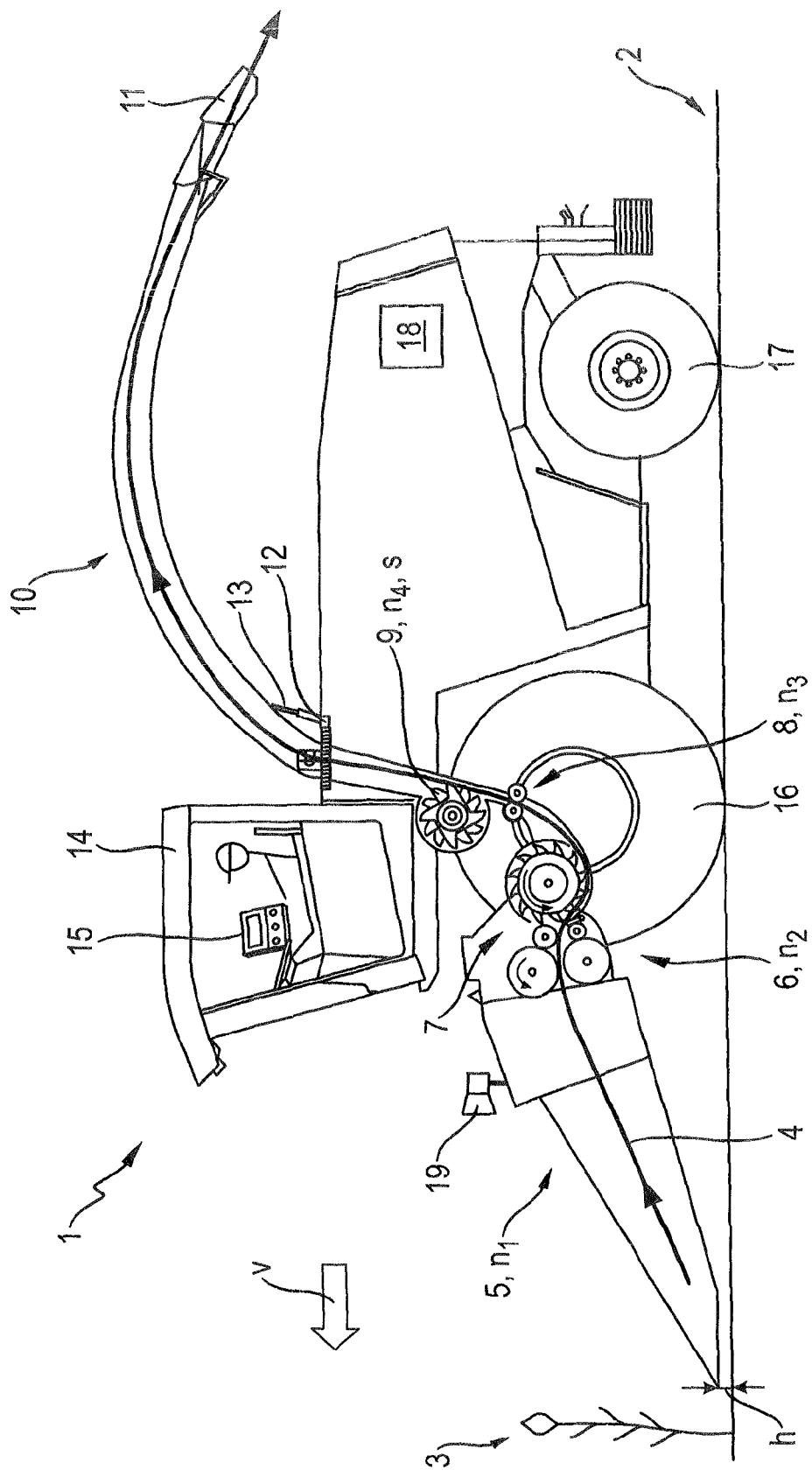
FIG. 1 presents a schematic side view of a forage harvester during harvesting travel.

FIG. 1 presents a harvesting machine according to the invention in the form of a forage harvester 1 in a schematic view from the side.

The forage harvester 1 travels across a field 2, in order to harvest a grown plant crop 3 (typically corn). In a manner known per se, the forage harvester 1 is equipped with a front harvesting attachment 5, which is used to cut the top part of the corn plant 3 from the field and feed this to the forage harvester 1 for further processing as crop 4. The crop 4, which has been picked up in this manner, is conveyed along the sketched, arrow-labeled line through the forage harvester 1 in order to then be transferred to a hauling vehicle (not illustrated here).

An intake conveyor mechanism 6 is located behind (downstream of) the front harvesting attachment 5 relative to the direction of crop flow, wherein this intake conveyor mechanism compresses the crop 4 and feeds said crop to a chopping assembly 7 at a defined speed. The chopping assembly 7 is equipped with a rotating chopper drum comprising knives, which, in interaction with a stationary shear bar, chops up the crop 4 into particles having a desired length of cut. The thusly chopped crop 4 passes through a conveyor chute, which rises toward the rear and is located underneath a driver's cab 14. The chopped crop preferably passes through an optional conditioning device 8, where the crop is accelerated by a discharge accelerator 9 to a speed that is suitable for discharge through a transfer device 10.

The front harvesting attachment 5, the intake conveyor mechanism 6, the conditioning device 8 and/or the discharge accelerator 9 are adjustable in terms of speed, i.e., the rotational speeds $n_1$, $n_2$, $n_3$, $n_4$ respectively. Such adjustability makes it possible to change, in particular, the crop conveyance speed, the cutting length achieved, a fragmentation effect and/or the discharge performance of these functional devices. In the case of the discharge accelerator, a gap width s (between the discharge paddle and housing) can also be changed, whereby the attainable throwing action thereof can also be changed.

The height of the front harvesting attachment 5 also is adjustable, thereby making it possible to attain different cutting heights h. The lower the cutting height h is set, the closer the front harvesting attachment 5 comes to the ground. Given a short cutting height h, the risk of damage occurring to the front harvesting attachment 5 therefore increases, in particular in the case of uneven and/or contaminated (harvesting) terrain.

Furthermore, a self-steering device 19 is positioned on the front harvesting attachment 5, which implements automatic steering of the forage harvester 1 relative to the plant crop 3 on the basis of a detection (in this case: optically via camera, although mechanically via touch sensor is also possible) of the plant crop 3 located in front of the forage harvester 1. The self-steering devices renders it possible to steer the forage harvester 1 at a definable lateral distance from the planted corn rows, in particular, in order to harvest the field 2 along the plant rows.

The transfer device 10 is configured as so-called "upper discharge chute" and is vertically adjusted in a manner known per se by means of a vertical-adjustment cylinder 13. The transfer device 10 is swivelled laterally about a vertical rotational axis by means of a planetary gear 12, and, at the end of the transfer device 10 facing away from the machine, this transfer device comprises a discharge flap 11. The discharge flap 11 also is swivellable in order to define a discharge angle of the discharged crop 4. It should be noted that the forage harvester 1 in FIG. 1 is shown with the transfer device 10 swiveled to the rear, for clarity. In normal harvesting travel (across an already initially-cut field), the transfer device 10 is usually swiveled laterally by means of the planetary gear 12 and therefore extends out of (or into) the plane of the drawing.

A drive motor 18 disposed at the rear is used to drive the working mechanisms of the forage harvester 1, for the ground drive of the front wheels 16 and, optionally, the rear wheels 17 (when an all-wheel drive is engaged) and to supply other functional devices.

A control-, operating- and display device 15, which is accessible to a driver, is disposed in the driver's cab 14 and has a signal connection to the essential functional devices of the forage harvester 1. The control-, operating- and display device 15 thereby enables the driver to access and, in particular, monitor and control a plurality of functions available on the machine. A few of the forest harvestor or working device functions also are controllable, or are alternatively controllable via additional control elements disposed in the driver's cab 14, for example, via control levers, pushbuttons, rotary regulators and the like, in order to ensure particularly rapid access thereto.

If a driver drives the forage harvester 1 onto a new field to be worked, the driver must make particular adjustments to the forage harvester 1 at least in the first pass along the outer edges of the field. It is possible, inter alia, for the transfer procedure to take place using the transfer device 10 only toward the rear for reasons of space, which is not possible in the subsequent harvesting operation on the initially cut field due to the more difficult conditions encountered there (poorer visibility, greater throwing distance and, therefore, a greater likelihood of missing).

The transfer also must take place toward the rear the first time a field is crossed over ("cutting a path"). For travel along the edge of the field, the driver also must remain alert to prevent damage to the front attachment 5, which can occur, for example, upon collision of the front harvesting attachment 5 with contaminants on the ground, such as stones, waste, and/or plant stands extending onto the field, or any other interfering objects, including those from adjacent terrains (fields, woods, cultivated areas, etc.).

According to the invention, the driver is supported by an automated function, which is carried out by the control-, operating- and display device 15 as the driver implements the large number of settings required for the initial cutting of the field. To this end, the control-, operating- and display device 15 can be operated (for example, by manual actuation by pressing a button), in a field initial-cutting mode for the purpose of specifying at least one parameter setting each for a large number of functional devices, which can be individually selected by the driver. Parameter setting the forage harvester 1 is therefore brought into a configuration that is suitable for the initial cutting of the field.

Figure 2:
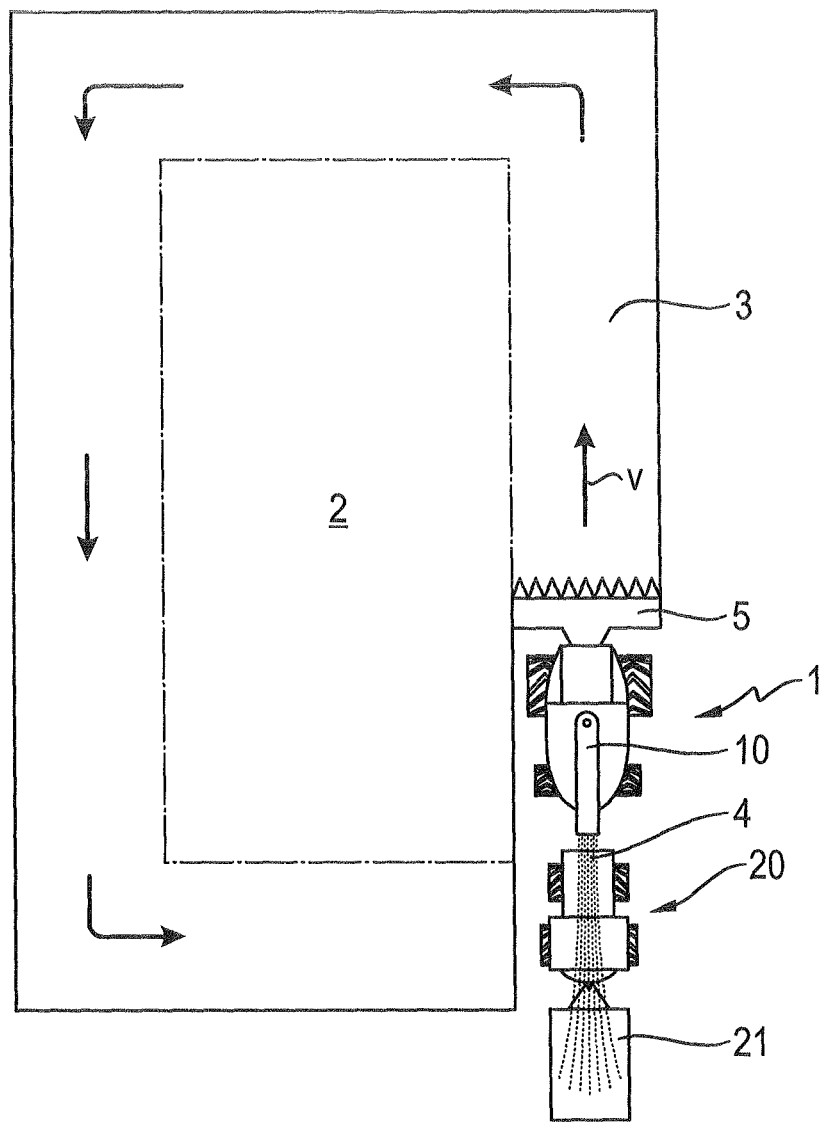
FIG. 2 presents a schematic top view of a forage harvester and an accompanying tractor drawing a hauling trailer, the forage harvester performing the initial cutting of a field.

FIG. 2 shows such a configuration in a top view of a schematically shown forage harvester 1. The forage harvester according to FIG. 2 is a forage harvester of the type described by reference to FIG. 1, for example. A field 2 having a rectangular shape contains a plant crop 3. In order to harvest the field 2, the forage harvester 1 must first encircle the field 2 along the outer edges thereof, as indicated by the directional arrows. To this end, the forage harvester 1 has been initially switched into afield initial-cutting mode, wherein the control-, operating- and display device 15 has implemented various measures.

Inter alia, the transfer device 10 has been swivelled into a rearward-pointing direction by means of the planetary gear 12. The discharge flap 11 is now completely open and the vertical-adjustment cylinder 13 has been extended in order to permit the crop 4 to be thrown across a maximum distance into a hauling trailer 21 being drawn behind the forage harvester 1 by a tractor 20. To this end, the gap width s of the discharge accelerator 9 has also been set to a minimum extent. Optionally, it could also be possible to increase the rotational speed $n_4$ of the accelerator 9 in order to further increase the discharge performance.

In addition, an increased cutting height h has been set in order to prevent damage to the front harvesting attachment 5. A ground speed v, which can be specified by the cruise controller, has been set to reduced level.

Numerous further parameter settings can be implemented within the scope of the field initial-cutting mode, each of which can be selected by the driver. That is, the driver can individually select which parameters should even be influenced within the scope of the field initial-cutting mode. Furthermore, the driver can specify a desired setting value for each selected parameter. Depending on the functional device involved, these can be numerical values (cutting height, flap angle, rotational speed and the like) and/or activation states (autopilot on/off, automatic transfer control on/off, cruise controller on/off).

Advantageously, it is possible for the activation of the field initial-cutting mode to also trigger a procedure carried out in preparation of the harvesting operation. This can be, for example, a cleaning procedure that must be performed on a functional device of the forage harvester 1 (e.g. cleaning the drum disk underneath the chopper drum) before travel is started, or a calibration procedure.

Upon completion of the initial cutting of the field, the field initial-cutting mode can be deactivated once more. Upon deactivation, the control-, operating- and display device 15 (then) specifies parameter settings for a previously implemented configuration of the forage harvester 1 or for any other retrievably stored configuration, and adjusts the machine accordingly.

The parameter specification for the initial cutting of the field, according to the invention, clearly relieves the driver of tasks, since the forage harvester 1 can be easily, rapidly, and reliably switched into and back out of a configuration adapted to the intended use of "initial cutting of a field". Various functions that are available on the forage harvester 1 (including automated functions) can therefore be rapidly used with other settings without the need to make individual adjustments. Furthermore, the risk of maladjustments is therefore reduced.

LIST OF REFERENCE CHARACTERS 1 forage harvester
2 field
3 plant crop
4 crop
5 front harvesting attachment
6 intake conveyor mechanism
7 chopping assembly
8 conditioning device
9 discharge accelerator
10 transfer device
11 discharge flap
12 planetary gear
13 vertical-adjustment cylinder
14 driver's cab
15 control-, operating-, and display device
16 front wheel
17 rear wheel
18 drive motor
19 self-steering device
20 tractor
21 hauling trailer
h cutting height
v ground speed
$n_1$ speed of front harvesting attachment
$n_2$ intake speed
$n_3$ speed of conditioning device
$n_4$ speed of discharge accelerator
s gap width of discharge accelerator As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A self-propelled forage harvester, comprising:
   a front harvesting attachment for picking up crop from a field;
   at least one working mechanism for processing the crop, conveying the crop or both; and
   a control device;
   wherein at least one functional device assigned to the harvesting machine includes the front harvesting attachment and the at least one working mechanism and is adjusted with respect to at least one parameter selected from the group consisting of: a cutting height (h), a ground speed (v), a speed of front harvesting attachment (n1), an intake speed (n2), a speed of conditioning device (n3), a speed of discharge accelerator (n4) and a gap width of discharge accelerator (s), for the purpose of adapting the respective functional device to different conditions of use;
   wherein the control device is operated in a field initial-cutting mode in order to specify settings of the at least one parameter for the at least one of the functional device in order to bring the harvesting machine into a configuration that is suitable for the initial cutting of the field; and
   wherein the field initial-cutting mode is a harvesting machine configuration suitable for the harvesting machine to initially cut a field covered by a plant crop for the first time on an outer edge, to travel through the field covered by the plant crop for the first time or both.

2. The harvesting machine according to claim 1, wherein a specification comprises settings of the at least one parameter for a plurality of the functional devices.

3. The harvesting machine according to claim 2, wherein the specification takes place in the form of a recommendation by optical display, by acoustic notification to an operator or both.

4. The harvesting machine according to claim 1, wherein the control device has a signal connection to the at least one functional device in order to implement the at least one parameter setting on said functional device upon activation of the field initial-cutting mode.

5. The harvesting machine according to claim wherein the control device has access to a data memory, in which information related to the settings for the at least one parameter to be specified within the scope of the field initial-cutting mode are stored, and wherein the stored at least one parameter settings information is retrievable upon activation of the field initial-cutting mode.

6. The harvesting machine according to claim 5, wherein various sets of at least one parameter settings information are retrievably stored in the data memory, and wherein the information sets are assignable to various kinds of crop, different operators, different operating conditions and combinations thereof.

7. The harvesting machine according to claim 5, wherein the stored information contains a selection of one or more of the at least one parameter to be specified.

8. The harvesting machine according to claim 5, wherein the stored information stored for a single parameter of the at least one parameter contains a setting value in each case.

9. The harvesting machine according to claim 1, wherein each at least one parameter set by the control device (15) within the scope of the field initial-cutting mode is individually selectable and editable in terms of the setting thereof.

10. The harvesting machine according to claim 1, wherein the field initial-cutting mode is manually activated.

11. The harvesting machine according to claim 1, wherein the control device automatically activates the field initial-cutting mode as soon as state information ascertained by the harvesting machine indicates the initial cutting of a field.

12. The harvesting machine according to claim 1, wherein the group from which the at least one parameter is selected further includes an activation state; a cruise controller ground speed (v); a position of the transfer device including any of rotational angle, an elevation angle; and/or a flap angle thereof; an activation state of a self-cleaning device; a ground drive state; a tire pressure level; and a state of the illumination devices.

13. The harvesting machine according to claim 1, wherein upon activation of the field initial-cutting mode, a procedure is carried out in preparation of the harvesting travel is initiated.

14. The harvesting machine according to claim 13, wherein the procedure is a cleaning procedure on a functional device of the harvesting machine.

15. The harvesting machine according to claim 1, wherein the field initial-cutting mode can be deactivated and wherein, upon deactivation of the field initial-cutting mode, the control device is operated to specify parameter settings for a previously implemented configuration of the harvesting machine or to initiate new settings.

16. The harvesting machine according to claim 1, wherein the at least one working mechanism includes any of the group consisting of an intake conveyor mechanism, a chopping assembly, a conditioning device, a discharge accelerator, a transfer device, a discharge flap, a planetary gear, a vertical-adjustment cylinder, a drive motor and a self-steering device.

* * * * *